(12) United States Patent
Fairy

(10) Patent No.: US 7,658,605 B2
(45) Date of Patent: Feb. 9, 2010

(54) EDGE GATED INJECTION MOLDING APPARATUS

(75) Inventor: Fabrice Fairy, Georgetown (CA)

(73) Assignee: Mold-Masters (2007) Limited, Georgetown (CA)

(*) Notice: Subject to any disclaimer, the term of this patent is extended or adjusted under 35 U.S.C. 154(b) by 220 days.

(21) Appl. No.: 11/961,210

(22) Filed: Dec. 20, 2007

(65) Prior Publication Data

US 2008/0160125 A1 Jul. 3, 2008

Related U.S. Application Data (60) Provisional application No. 60/882,872, filed on Dec. 29, 2006.

(51) Int. Cl.
*B29C 45/23* (2006.01)

(52) U.S. Cl. .................... 425/564; 425/572

(58) Field of Classification Search ........... 425/562, 425/563, 564, 565, 566, 572
See application file for complete search history.

(56) References Cited

U.S. PATENT DOCUMENTS

| | | | |
|---|---|---|---|
| 2,471,683 A | 5/1949 | Halbach | |
| 4,212,624 A | 7/1980 | Ando et al. | |
| 4,662,837 A | 5/1987 | Anderson | |
| 5,494,433 A | 2/1996 | Gellert | |
| 5,851,571 A | 12/1998 | Manner | |
| 6,146,123 A | 11/2000 | Lausenhammer et al. | |
| 6,162,044 A | 12/2000 | Babin | |
| 6,245,279 B1 | 6/2001 | Kalemba | |
| 7,179,081 B2 * | 2/2007 | Sicilia et al. ............ | 425/572 |
| 7,547,208 B2 * | 6/2009 | Babin et al. ............. | 425/562 |
| 2003/0224086 A1 | 12/2003 | Olaru | |
| 2004/0009259 A1 | 1/2004 | Manner | |

(Continued)

FOREIGN PATENT DOCUMENTS

DE 36 42 343 C2 6/1988

(Continued)

OTHER PUBLICATIONS

Extended European Search Report for Application No. 07024658.0-1253, Apr. 25, 2008.

(Continued)

*Primary Examiner*—Tim Heitbrink
(74) *Attorney, Agent, or Firm*—Medler Ferro PLLC (57) ABSTRACT

An injection molding apparatus includes an injection manifold having a melt channel. A hot runner injection nozzle includes an axial melt channel extending along a central axis and communicating with the manifold melt channel. The nozzle further includes at least two angled melt channels disposed at an angle to the central axis. At least two nozzle tips are provided, and each includes a nozzle tip melt channel in communication with one of the angled melt channels. An axial valve pin is disposed coaxially with the central axis and is disposed outside of the axial melt channel. Lateral valve pins movable within the nozzle tip melt channels are disposed at an angle to the valve pin. A linkage system connects the lateral valve pins to the axial valve pin. Movement of the axial valve pin is transmitted through the linkage system to the lateral valve pins to open and close communication between the nozzle tip melt channels and the lateral mold gates.

29 Claims, 4 Drawing Sheets

U.S. PATENT DOCUMENTS

| | | |
|---|---|---|
| 2005/0019444 A1 | 1/2005 | Sicilia et al. |
| 2005/0196486 A1 | 9/2005 | Babin et al. |
| 2006/0082031 A1 | 4/2006 | Dewar |
| 2006/0233911 A1 | 10/2006 | Spuller |
| 2006/0257521 A1 | 11/2006 | Spuller |
| 2008/0152752 A1 | 6/2008 | Klobucar et al. |

FOREIGN PATENT DOCUMENTS

| | | |
|---|---|---|
| EP | 0186413 A2 | 7/1986 |
| EP | 0186413 A3 | 7/1986 |
| EP | 0447573 B1 | 8/1995 |
| JP | 11-2277573 | 10/1999 |
| JP | 2002-283409 | 10/2002 |

OTHER PUBLICATIONS

Extended EP Search Report from EP App 07024965.1-1253, Apr. 17, 2008.

"Hot Runner System Solves Side Valve Gating Problems", *British Plastics & Rubber* Oct. 1, 2006.

"Manner SideGate—Valve Gate Nozzle For Side Injection", *Manner Brochure* May 2006.

* cited by examiner

EDGE GATED INJECTION MOLDING APPARATUS

CROSS-REFERENCE TO RELATED APPLICATIONS

This application claims the benefit of U.S. provisional patent application No. 60/882,872 filed Dec. 29, 2006, which is hereby incorporated by reference in its entirety herein.

BACKGROUND OF THE INVENTION

1. Field of the Invention

The present invention relates generally to an injection molding apparatus and, in particular, to a valve pin mechanism for use in an edge-gated injection molding apparatus.

2. Related Art

Edge gating from a nozzle of an injection molding apparatus through a number of edge gate tips is well known. A multi-cavity edge, or side, gated injection molding apparatus is described in U.S. Pat. No. 5,494,433 to Gellert, issued Feb. 27, 1996, which is incorporated by reference herein in its entirety. Generally, the multi-cavity edge-gated injection molding apparatus includes several nozzles that are coupled to a manifold to receive a melt stream of moldable material therefrom. Each nozzle is mounted in a cylindrical opening in a mold to convey pressurized melt through a nozzle melt channel to mold gates, which lead to mold cavities in the mold. The mold cavities are spaced radially around the nozzle. Each mold gate extends through a gate insert, which is held in position by a gate insert retainer plate. Each mold gate is aligned with a gate seal that is threadably coupled to the nozzle. As such, the location of the gate seals is generally fixed relative to the mold.

A multi-cavity edge gated injection molding apparatus with a first nozzle, a nozzle link, and a second nozzle is described in U.S. Published Application Publication No. 2005-0196486 A1, published Sep. 8, 2005, which is incorporated by reference herein in its entirety. U.S. Published Application Publication No. 2005-0196486 does not disclose a valve pin mechanism for opening and closing communication to the mold gates.

An edge gated injection molding nozzle including a valve pin mechanism is disclosed in U.S. Published Patent Application Publication No. 2006-0233911 A1 to Spuller, published Oct. 19, 2006. However, the nozzle of the Spuller publication includes a nozzle melt channel on either side of the valve pin. In such an arrangement, melt distributed to the cavities on either side of the valve pin travel different distances, and may therefore lead to a melt flow imbalance towards the lateral gates.

SUMMARY OF THE INVENTION

According to an embodiment of the present invention, an injection molding apparatus includes an injection manifold having a melt channel. A hot runner injection nozzle includes an axial melt channel extending along a central axis and communicating with the manifold melt channel. The nozzle further includes at least two angled melt channels disposed at an angle to the central axis. At least two nozzle tips are provided, and each includes a nozzle tip melt channel in communication with one of the angled melt channels. An axial valve pin is disposed coaxially with the central axis and is disposed outside of the axial melt channel. In an embodiment, the axial valve pin may be disposed on an opposite side of the nozzle as the manifold. Lateral valve pins movable within the nozzle tip melt channels are disposed at an angle to the axial valve pin. A linkage system connects the lateral valve pins to the axial valve pin, such that movement of the axial valve pin is transmitted through the linkage system to the lateral valve pins to open and close communication between the nozzle tip melt channels and the lateral mold gates.

In an embodiment, rotary movement of the axial valve pin is transmitted through the linkage system and translated into axial movement of the lateral valve pins. In another embodiment, axial movement of the axial valve pin is transmitted through the linkage system and translated into axial movement of the lateral valve pins.

In an embodiment, the nozzle includes a first nozzle portion and a second nozzle portion. In another embodiment, the first and second nozzle portions are separate pieces and are joined by a nozzle link, such that the axial melt channel is disposed in the first nozzle portion and the angled melt channels are disposed in the second nozzle portion. The nozzle link also includes a melt channel that is aligned with the axial melt channel. In another embodiment, the first nozzle portion and the second nozzle portion are integral, such that the axial melt channel is disposed in the first nozzle portion and the angled melt channels are disposed in the second nozzle portion.

The nozzle is heated. The first and second nozzle portions may be heated by a single heater or may be heated by independently controlled heaters.

BRIEF DESCRIPTION OF THE FIGURES

Embodiments of the present invention will now be described more fully with reference to the accompanying drawings where like reference numbers indicate similar structure. The drawings are not to scale.

DETAILED DESCRIPTION OF THE INVENTION

Figure 1:
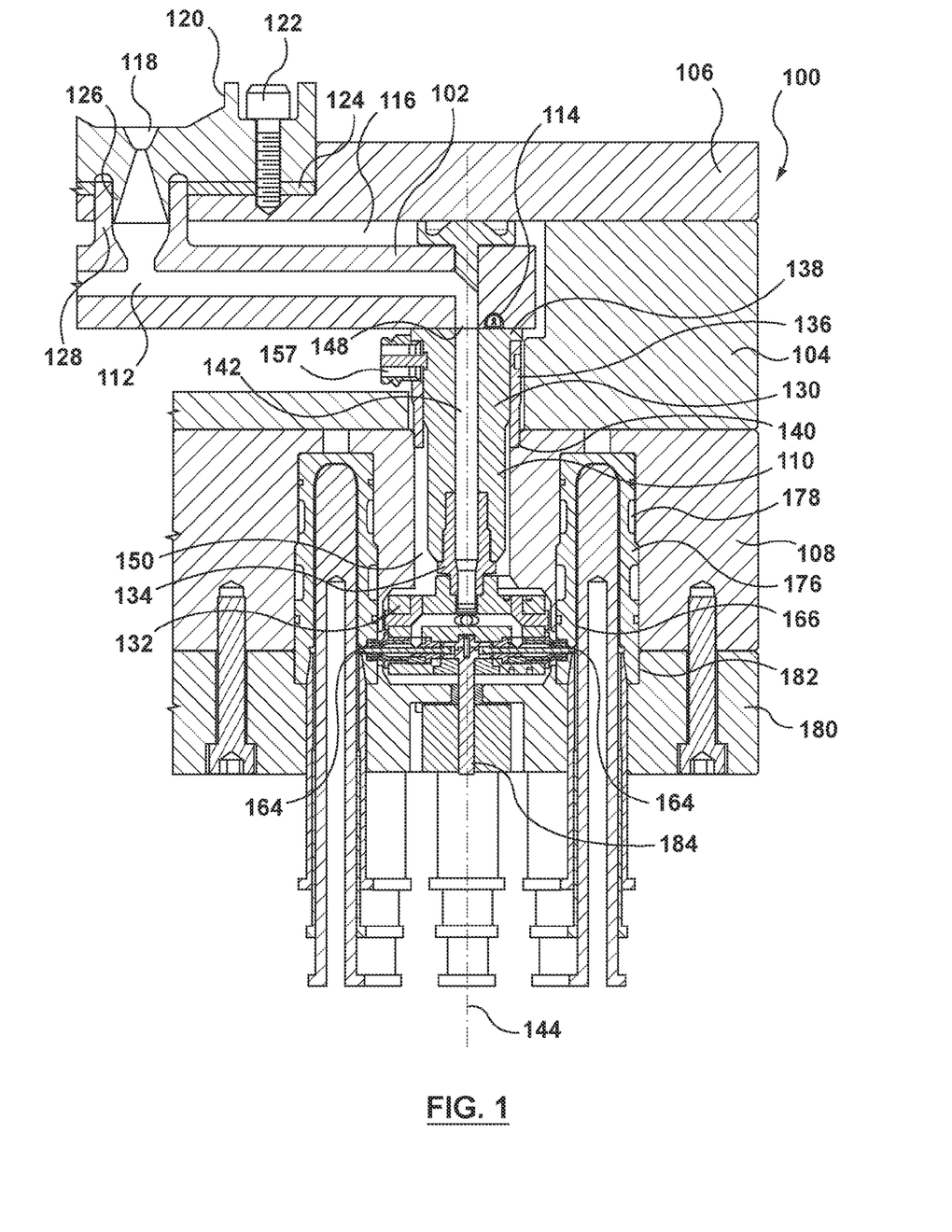
FIG. 1 is a partial cross-sectional view of a portion of an injection molding apparatus according to an embodiment of the present invention.
Figure 2:
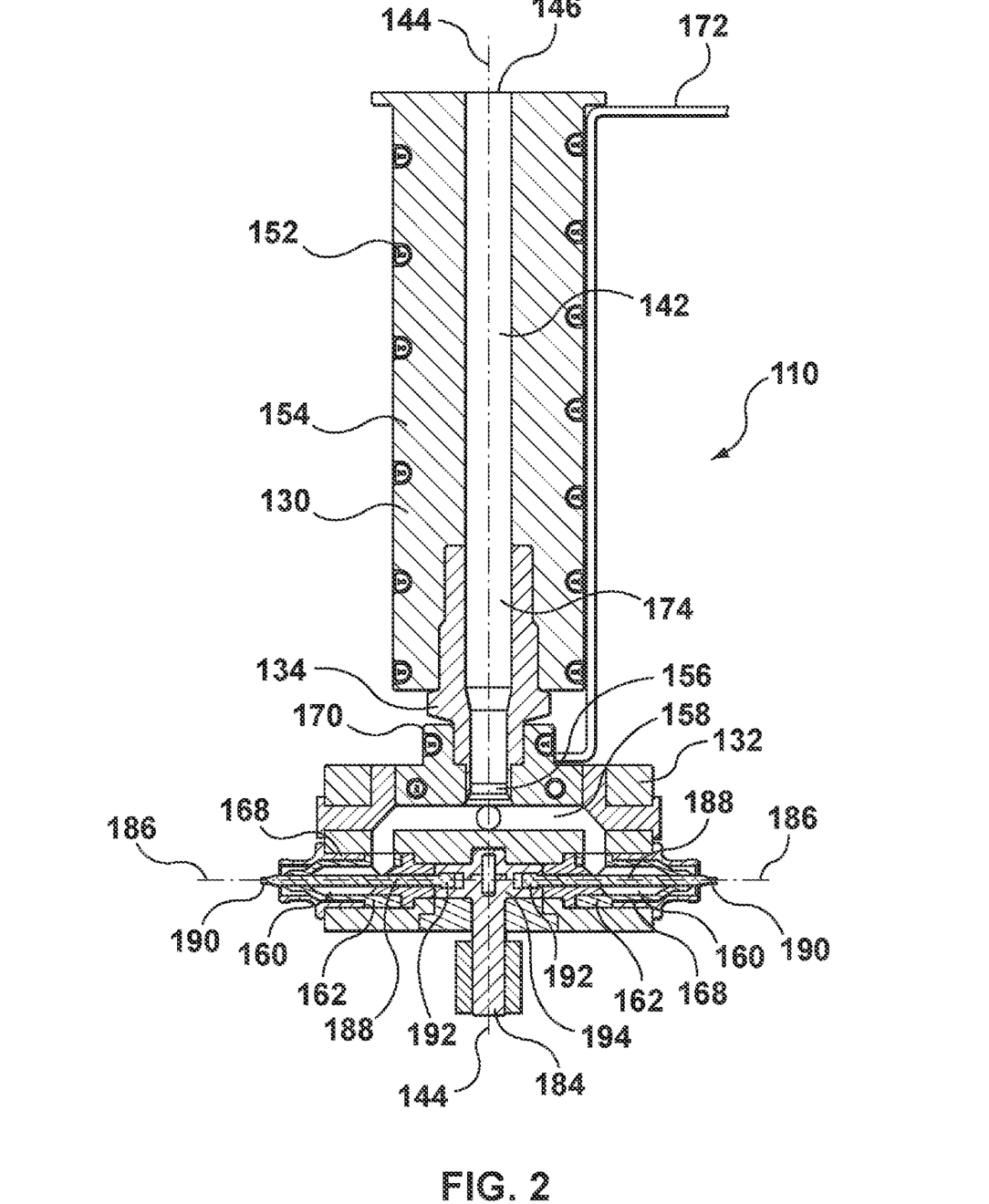
FIG. 2 is a cross-sectional view of a nozzle of FIG. 1.

A partial sectional view of an injection molding apparatus in accordance with the present invention is illustrated in FIG. 1 and is generally indicated by reference numeral 100. FIG. 2 illustrates an enlarged cross-sectional view of a nozzle 110 of injection molding apparatus 100 of FIG. 1. Injection molding apparatus 100 includes a melt distribution manifold 102 that is located between a spacer plate 104 and a back plate 106. While molds have a wide variety of configurations, in this case spacer plate 104 is mounted between a cavity plate 108 and back plate 106 which are secured together by bolts (not shown) in a conventional manner. Spacer plate 104 and cavity plate 108 are aligned by dowel pins (not shown). Manifold 102 is supported on spacer plate 104 by a locating and supporting ring (not shown). Manifold 102 includes a branched melt passage 112 and is heated by an integral electrical heating element 114. An insulative air space 116 is provided between manifold 102 and the surrounding cooled spacer plate 104 and back plate 106.

Melt passage 112 receives melt from a molding machine (not shown) through a central inlet 118 in a locating ring 120 seated in back plate 106. Locating ring 120 is secured in place by bolts 122 which extend through an insulation ring 124. Locating ring 120 has a sprue stem 126 projecting into a cylindrical inlet portion 128 of heated manifold 102 to allow for movement of manifold 102 during installation and to provide for thermal expansion and contraction.

A plurality of nozzles 110 are coupled to the manifold 102 (only one is shown in FIG. 1 for simplicity). In the embodiment shown in FIGS. 1-5, nozzle 110 includes a first nozzle portion 130, a second nozzle portion 132, and a nozzle link 134 coupling the first nozzle portion 130 and the second nozzle portion 132. In this embodiment, the first nozzle portion 130 is coupled to the manifold 102 using a flange 136 between a head portion 138 of first nozzle portion 130 and a shoulder 140 of cavity plate 108. As would be understood by those of ordinary skill in the art, other means of coupling first nozzle portion 130 to manifold 102 may be used, such as bolts.

First nozzle portion 130 includes a first nozzle melt channel 142 extending therethrough along a central longitudinal axis 144. Melt channel 142 includes an inlet 146 that is aligned with an outlet 148 of manifold melt channel 112. First nozzle portion 130 extends through an opening 150 which extends through spacer plate 104 and cavity plate 108. A nozzle heater 152 is coupled about nozzle body 154 of first nozzle portion 130 to provide heat thereto. The nozzle heater 152 is in communication with a power source (not shown) through an electrical connector 157. A thermocouple (not shown) may be coupled to first nozzle portion 130 to provide temperature measurements thereof.

Figure 3:
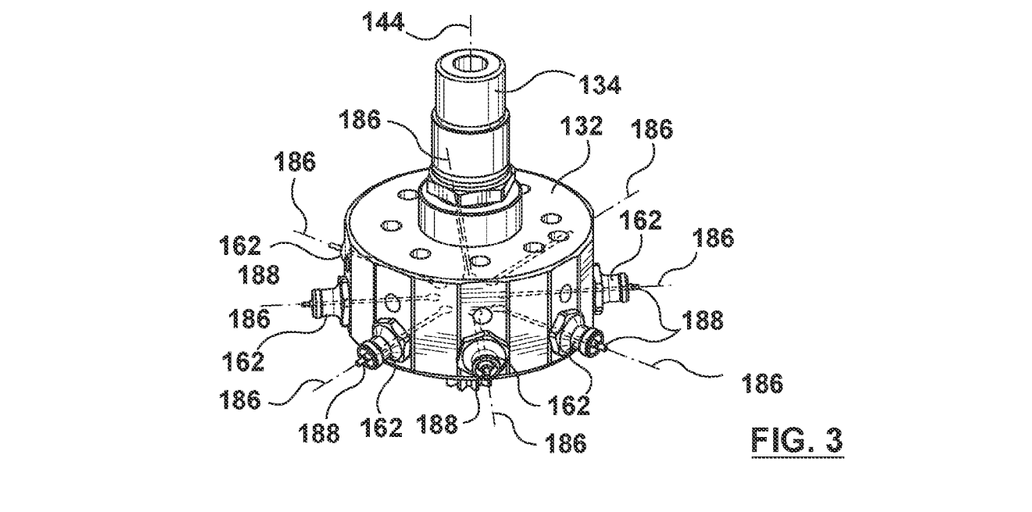
FIG. 3 is a perspective view of the nozzle of FIG. 2.
Figure 4:
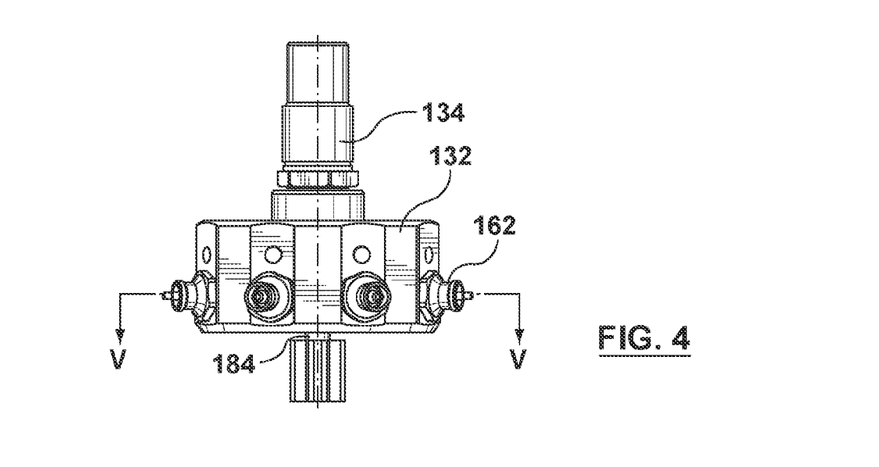
FIG. 4 is a side view of the nozzle of FIG. 2.
Figure 5:
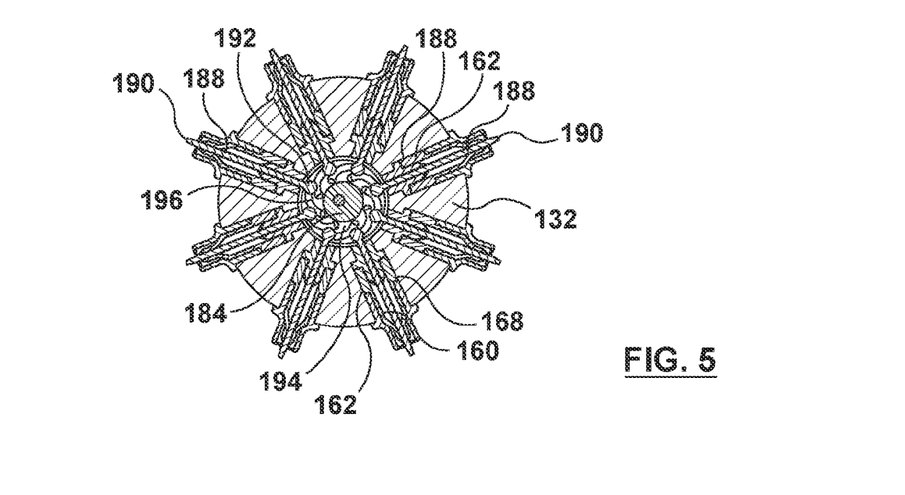
FIG. 5 is a cross-sectional view along line V-V of the nozzle of FIG. 4.

Second nozzle portion 132 is shown coupled to first nozzle portion 130 by a nozzle link 134. Second nozzle portion 132 includes a second nozzle melt channel 156 with a plurality of melt passages 158 that extend at an angle from a forward end of second nozzle melt channel 156. Angled melt passages 158 are angled to guide a melt stream toward radially extending melt passages 160 that extend through nozzle tips/gate seals 162 to deliver melt through mold gates 164 to a series of mold cavities 166. Mold cavities 166 are radially spaced around nozzle tips/gate seals 162, which are disposed in openings 168 in second nozzle portion 132. Second nozzle portion 132 is substantially puck-shaped, as shown in FIGS. 3-5, although other arrangements of internal components can lead to other practical shapes. A nozzle heater 170 is coupled to second nozzle portion 132 to provide heat thereto. Nozzle heater 170 is in communication with a power source (not shown) through an electrical connector (not shown). A thermocouple 172 is coupled to second nozzle portion 132 to provide temperature measurements thereof.

In the embodiment of FIGS. 1-5, first nozzle portion 130 and second nozzle portion 132 are heated by independent heaters 152, 170 that can be independently controlled to precisely control the heat profile of the melt. However, as would be understood by one of ordinary skill in the art, a single heater may be used for both first and second nozzle portions 130, 132. Such a single heater can have a wire portion that loosely bridges the gap between the first and second nozzle portions 130, 132, so that the first and second nozzle portions 130, 132 can be separated to allow the nozzle link 134 to be easily removed. Alternatively, the single heater may have a connector to allow separation of the first and second nozzle portions 130, 132.

Nozzle tips or gate seals 162 threadably engage second nozzle portion 132 and include melt passages 160 to deliver melt from angled melt passages 158 to mold cavities 166 via mold gates 164. Each nozzle tip/gate seal 162 is longitudinally fixed in position relative to each respective mold gate 164 and mold cavity 166. Nozzle tips/gate seals 162 shown in FIGS. 1-5 are of a two-piece construction, however, one of ordinary skill in the art would recognize that various nozzle tip/gate seal designs, such as one-piece nozzle tips/gate seals, may be used.

Further details regarding first nozzle portion 130, second nozzle portion 132, and nozzle link 134 can be found in U.S Published Patent Application Publication No. 2005-0196486 A1, the entirety of which is incorporated by reference herein.

A melt stream of molten material is delivered under pressure from a machine nozzle (not shown) to manifold channel 112 of manifold 102. The melt is distributed from manifold channel 112 to nozzle melt channels 142 of a plurality of first nozzle portions 130. The melt flows from the nozzle melt channels 142, through melt passages 174 of nozzle links 134 and into the second nozzle melt channels 156. The melt then flows through angled melt passages 158, through radial melt passages 160 of nozzle tips/gate seals 162, past gates 164 and into a respective mold cavity 166. Once the injection portion of the cycle is complete, the molded parts are cooled and ejected from the mold cavities.

In the embodiment shown in FIG. 1, several elongated cavities 166 are spaced around each nozzle 110. Cavities 166 each extend within a cavity insert 176. A number of the cavity inserts 176 are spaced around each nozzle 10 in holes 178 in the cavity plate 108. Cooling water is pumped through cooling conduits (not shown) extending around each cavity insert 176 to provide cooling between the heated nozzle 110 and the cavities 166. A retainer plate 180 has recesses 182 therein in which the cavity inserts 176 are received. Thus, the cavity inserts 176 are retained in place between retainer plate 180 and cavity plate 108.

FIG. 3 is a perspective view of second nozzle portion 132 and nozzle link 134. Six nozzle tips/gate seals 162 are shown coupled to second nozzle portion 132 in FIG. 3, although as shown in FIG. 5, and illustrated with phantom axis lines in FIG. 3, eight nozzle tips/gate seals 162 are coupled to second nozzle portion 132. Nozzle tips/gate seals are concentrically disposed about axes 186. Axes 186 are each substantially perpendicular to central axis 144. FIG. 4 is a side view of second nozzle portion 132 and nozzle link 134. It would be understood by those of ordinary skill in the art that there may be more or less than eight nozzle tips/gate seals coupled to second nozzle portion 132. Further, although axes 186 of nozzle tips/gate seals 162 are shown perpendicular to central axis 144, it would be understood that axes 186 can be disposed at any angle with respect to central axis 144, ranging from 1 to 179 degrees.

In order to control flow of the melt from manifold 102, through nozzle 110, and into mold cavities 166, a valve pin system is provided, which will be described with respect to FIGS. 1-5. A primary or axial valve pin 184 is provided parallel to central axis 144. A secondary or lateral valve pin 188 is at least partially disposed within each radial melt passage 160 of each nozzle tip/gate seal 162. Lateral valve pins 188 each include a tip portion 190 to engage a respective gate 164 to shut off flow to the respective cavity 166 associated with the gate and the nozzle tip. Lateral valve pins 188 also include a head portion 192 that is coupled to axial valve pin 184. In the embodiment of FIGS. 1-5 a disc 194 is coupled to axial valve pin 184 and engages head portion 192 of each lateral valve pin 188, as shown in FIG. 5. Disc 94 includes a cam 196 for each lateral valve pin head portion 192. In particular, in FIG. 5, the lateral valve pins 188 are in a retracted position such that melt may flow through gates 164 into cavities 166. Upon turning axial valve pin 184 in a clockwise direction, disc 194 also moves in a clockwise direction. Cams 196 thereby slide along head portions 192, which act as followers, of lateral valve pins 188, thereby pushing lateral valve pins 188 towards gates 164. When the apices of ramps 196 match the apices of head portions 192, tip portions 190 of the lateral valve pins 188 are engaged with mold gates 164, thereby shutting off flow of melt into cavities 166. When in the shut position, turning axial valve pin 184 in the counter-clockwise direction causes disc 194 to turn in the counter-clockwise direction such that cams 196 return to the position shown in FIG. 5. Lateral valve pins 188 thereby move away from gates 164 such that tip portions 190 disengage from gates 164, thereby allowing melt to flow through gates 164 to cavities 166. Axial valve pin 184 can be turned by an actuator, as would be know to one of ordinary skill in the art.

Figure 6:
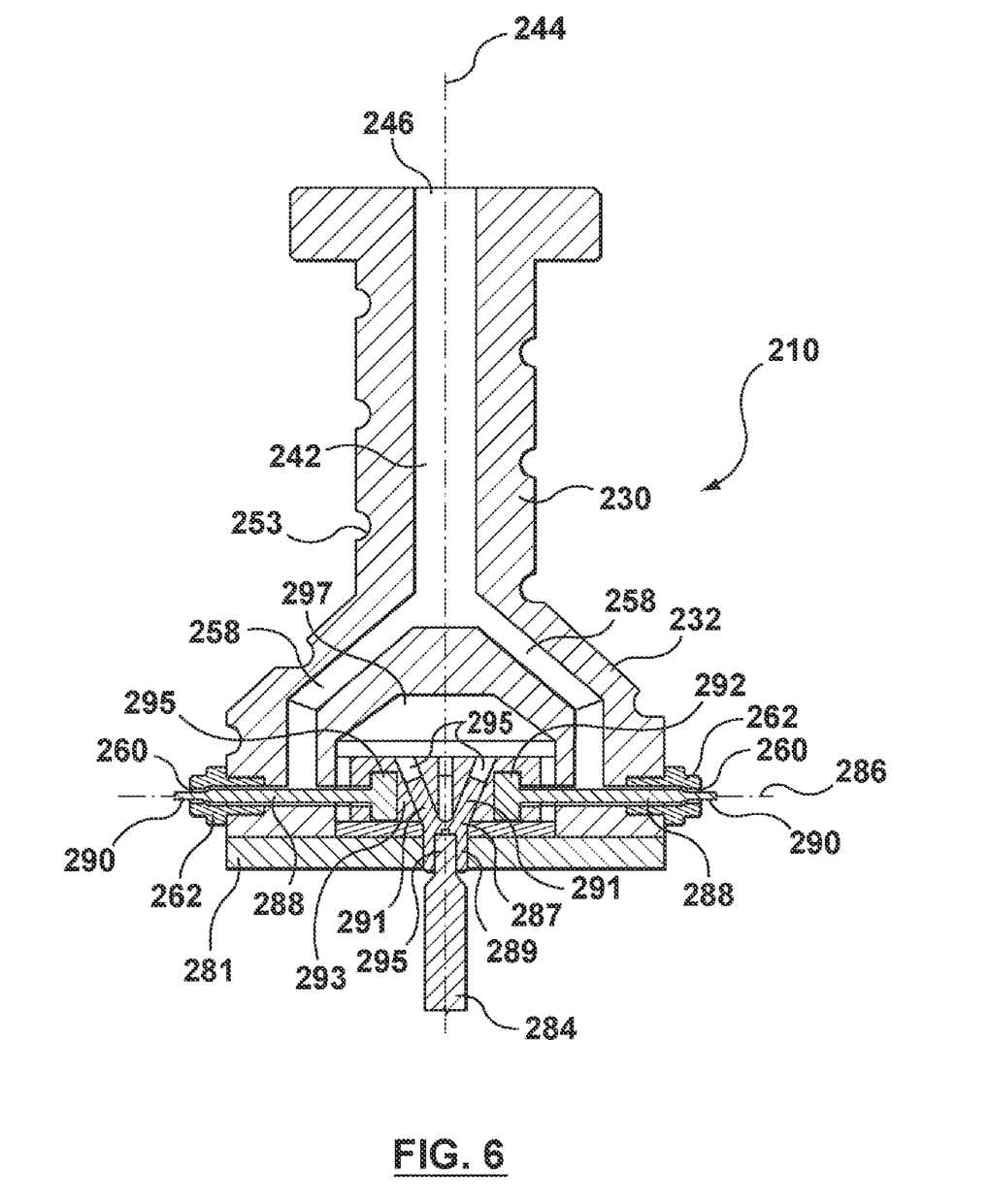
FIG. 6 is a cross-sectional view of a nozzle according to another embodiment of the present invention.

FIG. 6 shows another embodiment of a nozzle 210 made in accordance with the present invention. Nozzle 210 is used in an injection molding apparatus such as the injection molding apparatus 100 shown in FIG. 1. Nozzle 210 is similar to nozzle 110 shown in FIGS. 1-5 except that nozzle 210 does not include separate nozzle pieces coupled together, such as first nozzle portion 130 and second nozzle portion 132 coupled via nozzle link 134, as shown in the embodiment of FIGS. 1-5. Instead, first and second nozzle portions 230, 232 of nozzle 210 are unitary. Further, the mechanism for actuating secondary or lateral valve pins 288 utilizes an axial movement of primary or axial valve pin 284, rather than the rotary movement of axial valve pin 184 described with respect to FIGS. 1-5.

Nozzle 210 includes an axial melt channel 242 extending through first nozzle portion 230 along a central axis 244. Melt channel 242 includes an inlet 246 that is aligned with an outlet of a manifold melt channel, as described with respect to FIG. 1. Nozzle 210 includes a nozzle heater (not shown) disposed in groove 253. The nozzle heater is in communication with a power source (not shown) through an electrical connector (not shown), as shown in FIG. 1. A thermocouple (not shown) is coupled to nozzle 210 to provide temperature measurements thereof.

Melt channel 242 of nozzle 210 branches into angled melt passages 258 in second nozzle portion 232. Angled melt passages 258 extend at an angle from a forward end of melt channel 242. Angled melt passages 258 are angled to guide a melt stream toward radially extending melt passages 260 that branch out from angled melt passages 258 to deliver melt through mold gates to a series of mold cavities, as described with respect to FIG. 1. Nozzle tips/gate seals 262 are coupled to a side surface of second nozzle portion 232.

Nozzle tips/gate seals 262 threadably engage second nozzle portion 232 and include radially extending melt passages 260 to deliver melt from angled melt passages 258 to the mold cavities via the mold gates. Each nozzle tip/gate seal 262 is longitudinally fixed in position relative to each respective mold gate and mold cavity. Nozzle tips/gate seals 262 shown in FIG. 6 are of a one-piece construction, however, one of ordinary skill in the art would recognize that two-piece nozzle tips/gate seals may be used, such as those shown in FIGS. 1-5.

A melt stream of molten material is delivered from a manifold channel of a manifold to nozzle melt channel 242 through inlet 246. The melt flows from the nozzle melt channel 242, through angled melt passages 258, through melt passages 260 of nozzle tips/gate seals 262, past the mold gates and into a respective mold cavity. Once the injection portion of the cycle is complete, the molded parts are cooled and ejected from the mold cavities.

In order to control flow of the melt from the manifold, through nozzle 210, and into the mold cavities, a valve pin system is provided. Although not shown in FIG. 6, such a valve pin system includes an actuator that can move primary or axial valve pin 284 axially in a direction parallel to central axis 244. Axial valve pin 284 includes a head (not shown) coupled to the actuator, as known in the art. Axial valve pin 284 extends from the actuator, through a retainer plate 281, and is connected to a linkage system that couples axial valve pin 284 to secondary or lateral valve pins 288. Valve pin 284 is disposed coaxial with central axis 244.

Lateral valve pins 288 are provided at least partially within melt passages 260 of nozzle tips/gate seals 262. Each lateral valve pin 288 includes a tip portion 290 to engage a respective gate to shut off flow to the respective cavity. Each lateral valve pin 288 also includes a head portion 292 that is seated in a slider 293. Each slider 293 is coupled to axial valve pin 284 such that axial movement of valve pin 284 along central axis 244 results in lateral movement of lateral valve pins 288 along an axis 286. Axis 286 is disposed at an angle to central axis 244 such that the axes are not parallel. In the particular embodiment shown in FIG. 6, axis 286 is perpendicular to central axis 244. However, one of ordinary skill in the art would understand that axis 286 can be disposed at various angles to central axis 244 ranging from 1 degree to 179 degrees. Sliders 293 shown in FIG. 6 include a slot 295 disposed at an angle to central axis 244. Further, a Y-shaped linkage element 287 is coupled to an end 285 of axial valve pin 284 and is disposed in slots 295. In particular, Y-shaped linkage element 287 includes a head portion 289 coupled to end 285 of axial valve pin 284 and arms 291 disposed in slots 295 of sliders 293. Sliders 293 are movable within an opening 297 between second nozzle portion 232 and retainer plate 281.

Thus, when axial valve pin 284 is moved towards first nozzle portion 230 (upward in FIG. 6), Y-shaped linkage element 287 is pushed upward in slots 295. Such action causes the sliders 293 to move towards each other, thereby moving lateral valve pins 288 towards central axis 244. Such movement of lateral valve pins 288 towards central axis 244 causes tip portions 290 of lateral valve pins 288 to move away from respective gates such that melt can flow into respective cavities. FIG. 6 shows this open position with the Y-shaped linkage 287 pushed upwards in slots 295. Moving axial valve pin 284 away from first nozzle portion 230 (downward in FIG. 6) causes Y-shaped linkage element 287 to move downward with axial valve pin 284, thereby causing arms 291 to move downward and act on slots 295. Such movement causes sliders 293 to move apart from each other, thereby moving lateral valve pins 288 away from central axis 244 and towards the gates. Tip portion 290 of each lateral valve pin 288 thereby engages the gate to shut off flow to the respective cavity.

Sliders 293, Y-shaped linkage element 287, and associated parts are as described with respect to FIGS. 6 and 7 of U.S. Provisional Application No. 60/871,668, filed Dec. 22, 2006, which is incorporated by reference herein in its entirety.

It would be understood by those of ordinary skill in the art that although two nozzle tips, gates, and cavities are shown associated with nozzle 210, any number of tips, gates, and cavities may be utilized. For example, and not by limitation, four (4) nozzle tips, gates, and cavities may be associated with a nozzle of the injection molding apparatus. In such an arrangement, four (4) lateral valve pins would be utilized. Further, the Y-shaped linkage element would not be Y-shaped, but would instead include four (4) arms extending from the head portion thereof to engage within slots of four sliders. Similar modification can be made to accommodate other quantities of gates and cavities, as would be understood by those of ordinary skill in the art.

One of ordinary skill in the art would also recognize that the different features of the embodiments of FIGS. 1-5 and FIG. 6 can be intermingled. For example, and not by way of limitation, the linkage mechanism of FIG. 6 can be used with a nozzle that includes separate first and second nozzle portions coupled via a nozzle link. In another example, and not by way of limitation, the rotary motion of the axial valve pin, coupled to a disc that translates the rotary motion into an axial movement of lateral valve pins can be used in the embodiment of FIG. 6.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
    an injection manifold having an inlet and a melt channel;
    a hot runner injection nozzle having an axial melt channel extending along a central axis and communicating with said melt channel, the hot runner injection nozzle also including an angled melt channel disposed at an angle with respect to the central axis such that the angled melt channel and the axial melt channel are not parallel to each other;
    a nozzle tip including a nozzle tip melt channel, wherein said nozzle tip melt channel is in communication with said angled melt channel;
    a primary valve pin disposed coaxially with the central axis and disposed entirely outside of the axial melt channel;
    a secondary valve pin movable inside the nozzle tip melt channel, wherein the secondary valve pin is disposed at an angle to the primary valve pin such that the secondary valve pin is not parallel to the primary valve pin;
    a linkage system continuously connecting the secondary valve pin to the primary valve pin; and
    a lateral mold gate disposed at an angle with respect to the central axis such that the mold gate is not parallel to the central axis, the mold gate communicating with a mold cavity, wherein movement of the primary valve pin is transmitted through the linkage system to the secondary valve pin to open and close communication between the nozzle tip melt channel and the lateral mold gate.

2. The injection molding apparatus of claim 1, wherein the hot runner injection nozzle includes a first nozzle portion including the axial melt channel and a second nozzle portion including the angled melt channel.

3. The injection molding apparatus of claim 2, wherein the first nozzle portion and the second nozzle portion are separate pieces.

4. The injection molding apparatus of claim 3, further comprising a nozzle link connecting the first nozzle portion to the second nozzle portion.

5. The injection molding apparatus of claim 1, further comprising a heater surrounding the axial melt channel.

6. The injection molding apparatus of claim 5, wherein the heater also surrounds the angled melt channels.

7. The injection molding apparatus of claim 5, further comprising a second independent heater surrounding the angled melt channels.

8. The injection molding apparatus of claim 1, wherein the movement of the primary valve pin transmitted through the linkage system is a rotary movement.

9. The injection molding apparatus of claim 1, wherein the nozzle includes at least two angled melt channels, at least two nozzle tips with each of the nozzle tips including a nozzle tip melt channel, at least two secondary valve pins disposed in a respective nozzle tip melt channel, and at least two lateral mold gates.

10. The injection molding apparatus of claim 9, wherein the linkage system includes a disc coupled to the primary valve pin, wherein the disc includes a cam associated with each secondary valve pin such that the rotary movement of the primary valve pin causes an axial movement of the secondary valve pins.

11. The injection molding apparatus of claim 9, wherein the linkage system includes at least two linkage elements, wherein each linkage element includes a slider coupled one of the secondary valve pins and coupled to the primary valve pin.

12. The injection molding apparatus of claim 11, wherein the sliders of the linkage elements are each coupled to a Y-shaped element and the Y-shaped element is coupled to the primary valve pin.

13. The injection molding apparatus of claim 12, wherein the Y-shaped element includes at least two arms and a head portion, wherein each arm is disposed in an angled slot in one of the sliders and the head portion is coupled to the primary valve pin.

14. The injection molding apparatus of claim 1, wherein the primary valve pin is disposed on an opposite side of the nozzle as the manifold.

15. A hot runner nozzle for an injection molding apparatus comprising;
    an axial melt channel extending along a central axis;
    at least two angled melt channels disposed at an angle with respect to the central axis such that the angled melt channels and the axial melt channel are not parallel to each other;
    at least two nozzle tips each including a nozzle tip melt channel, wherein each nozzle tip melt channel is in communication with a respective one of the angled melt channels;
    a primary valve pin disposed coaxially with the central axis and disposed entirely outside of the axial melt channel;
    at least two secondary valve pins movable inside the nozzle tip melt channels and disposed coaxially with the nozzle tip melt channels; and
    a linkage system continuously connecting the secondary valve pins to the primary valve pin.

16. The hot runner nozzle of claim 15, wherein the hot runner nozzle includes a first nozzle portion including the axial melt channel and a second nozzle portion including the angled melt channels.

17. The hot runner nozzle of claim 16, wherein the first nozzle portion and the second nozzle portion are separate pieces.

18. The hot runner nozzle of claim 17, further comprising a nozzle link connecting the first nozzle portion to the second nozzle portion.

19. The hot runner nozzle of claim 15, further comprising a heater surrounding the axial melt channel.

20. The hot runner nozzle of claim 19, wherein the heater also surrounds the angled melt channels.

21. The hot runner nozzle of claim 19, further comprising a second independent heater surrounding the angled melt channels.

22. The hot runner nozzle of claim 15, wherein the movement of the primary valve pin transmitted through the linkage system is a rotary movement.

23. The hot runner nozzle of claim 15, wherein the linkage system includes a disc coupled to the primary valve pin, wherein the disc includes a cam associated with each secondary valve pin such that the rotary movement of the primary valve pin causes an axial movement of the secondary valve pins.

24. The hot runner nozzle of claim 15, wherein the linkage system includes at least two linkage elements, wherein each linkage element includes a slider coupled one of the secondary valve pins and coupled to the primary valve pin.

25. The hot runner nozzle of claim 24, wherein the sliders of the linkage elements are each coupled to a Y-shaped element and the Y-shaped element is coupled to the primary valve pin.

26. The hot runner nozzle of claim 25, wherein the Y-shaped element includes at least two arms and a head portion, wherein each arm is disposed in an angled slot in one of the sliders and the head portion is coupled to the primary valve pin.

27. An injection molding apparatus comprising:
an injection manifold having an inlet and a melt channel, wherein said melt channel branches to a plurality of melt channel outlets;
a hot runner injection nozzle having an axial melt channel extending along an axis and communicating with one of the melt channel outlets, the hot runner injection nozzle also including at least two angled melt channels communicating with the axial melt channel and disposed at an angle with respect to the axis such that the angled melt channels and the axial melt channel are not parallel to each other;
at least two nozzle tips each including a nozzle tip melt channel, wherein each nozzle tip melt channel is in communication with a respective one of the angled melt channels;
a primary valve pin disposed outside of the axial melt channel;
at least two secondary valve pins movable inside the nozzle tip melt channels, wherein the secondary valve pins are disposed at an angle with respect to the primary valve pin such that the secondary valve pins are not parallel to the primary valve pin;
a linkage system connecting the secondary valve pins to the primary valve pin; and
at least two lateral mold gates disposed at an angle with respect to the axis such that the mold gates are not parallel to the axis, each mold gate communicating with a mold cavity, wherein movement of the primary valve pin is transmitted through the linkage system to the secondary valve pins to open and close communication between the nozzle tip melt channels and the lateral mold gates.

28. The injection molding apparatus of claim 27, wherein the primary valve pin is disposed coaxially with the axial melt channel.

29. The injection molding apparatus of claim 27, wherein the linkage system continuously connects the second valve pins to the primary valve pin.

* * * * *